United States Patent Office 3,687,704
Patented Aug. 29, 1972

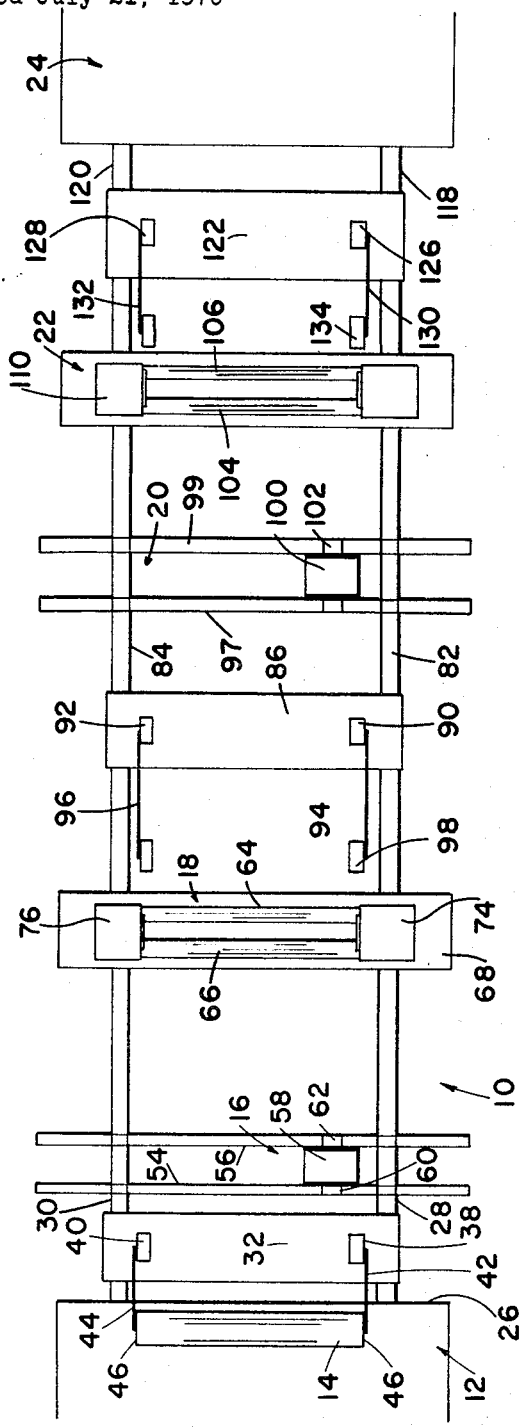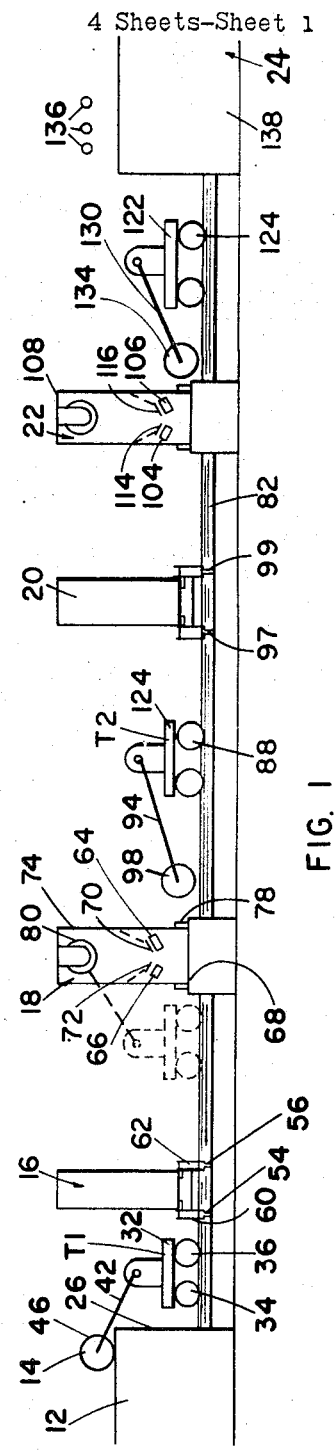

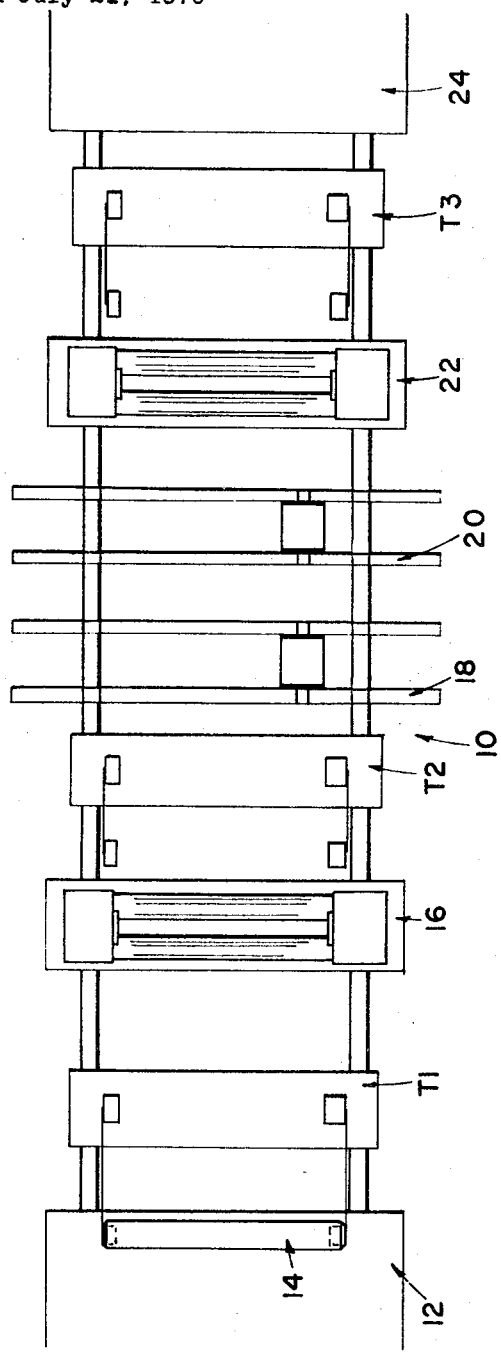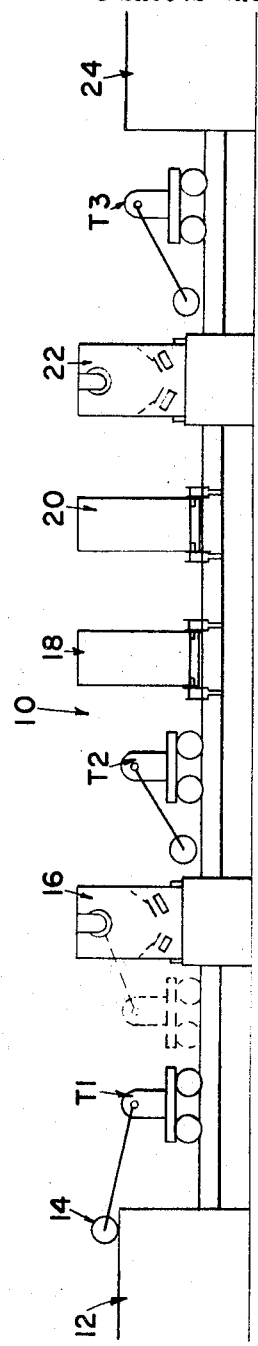

---

3,687,704
METHOD FOR COATING PIPE
Richard C. Stanley and Jesse M. Lewis, Tulsa, Okla.,
assignors to Midwestern Specialties, Ltd., Tulsa Okla.
Continuation-in-part of abandoned application Ser. No.
635,830, May 3, 1967. This application July 21, 1970,
Ser. No. 56,822
Int. Cl. B05b 5/02; B44d 1/094
U.S. Cl. 117—17　　　　　　　　　　　　　　　7 Claims

ABSTRACT OF THE DISCLOSURE

A method for coating pipe which consists of transporting a pipe section to a heating station by means of a first carrier device, rotating the pipe section during the heating thereof, transporting the heated pipe section to a first coating apparatus by means of a second carrier device, rotating the heated pipe section and simultaneously applying an initial layer of coating material to the exterior of the pipe in a longitudinal direction therealong, transporting the initially coated pipe section by the second carrier to a second coating station, simultaneously rotating the pipe section and applying a second layer of coating material to the exterior of the pipe section in a longitudinal direction therealong, and placing the coated pipe section on special saddles and subsequently transporting the pipe section by a third carrier device through a post cure heating station, and rotating the coated pipe section passing through the post cure heating station. Alternatively, the second coating may be applied while the pipe is still sufficiently hot to eliminate the second heating operation.

---

This application is a continuation-in-part application of co-pending application Ser. No. 635,830, filed May 3, 1967, and entitled "Method and Means for Coating Pipe," now abandoned. This invention relates to a method and means for processing pipes, cylindrical objects, and the like, and more particularly, but not by way of limitation, to a method and means for applying an external coating to extremely large pipe section weighing up to six tons, approximately.

It is well known that the service life of steel pipes whether disposed underground, or otherwise, is hampered or greatly lessened due to the elements surrounding the pipe. For example, the underground or buried metallic pipes are subjected to a great amount of external corrosion which results from a natural flow of electric current caused by the reaction between the metal surfaces and chemicals in the soil or water surrounding the structure. The electric current will flow from the metal into the adjacent soil and back to the metal, thus making the metallic structure an anode at the point where the current leaves the metallic structure, and as the current flows from the pipe, minute particles of the metal are carried into the soil, thereby causing pitting of the pipe. This is commonly called electrolysis and over a period of time the pipe may become severely damaged and required replacement. This is particularly disadvantageous with very large diameter pipe lines which are used for transporting natural gas at high pressures. Weakening of the pipe due to corrosion or other reasons can lead to explosions, causing severe damage and occasionally loss of life.

There are several methods utilized today for reducing the damage due to corrosion or electrolysis, and one of the most common methods is to provide a direct current flow from an outside source in an opposite direction to the flow of current from the pipe to render the structure cathodic instead of anodic (called cathodic protection), thus substantially precluding loss of minute metallic particles from the pipe. Another method consists of burying magnesium or other metallic anodes adjacent the structure to be protected, with the structure and anode being metallically connected to produce a galvanic cell to eliminate corrosion.

External coating of a pipe is also utilized for protection thereof, both in buried structures and in those structures disposed above ground, and is considered to be advantageous for several reasons. The coating may provide a more universal protection for the pipe, and provide a more lasting protection therefor in a more economical manner. However, many of the coatings presently available for the exterior of pipes have certain disadvantages in that the comparatively rough handling of the pipe during installation, and the like, frequently chips the coating or breaks the coating, and as a result deterioration of the metal can result. Common practice is to both coat the pipe and protect the pipe cathodically. Cathodic protection, however, frequently causes the coating to fail. Consequently, there has been a great study and effort put forth in the development of coatings for pipe, and particularly plastic coatings, which will overcome these disadvantages. For example, one such coating known under the trade name Nap-Gard has been developed by Napko Corporation, which has proven to be extremely efficient and desirable for the exterior coating of the pipes, being tough and showing great resistance to deterioration under cathodic protection. Nap-Gard is a high molecular weight cross linked polymer whose basic polymeric structure consists of linearized phenolic type units, further described in the Napko Industrial Coating Division publication SA-258 dated April 1967. This particular plastic coating requires the application of two coats of material. Whereas methods of applying the two coatings and subsequent heating operations to relatively small pipe sections (that is, sections of relatively small diameters such as two to twelve inches, and relatively small lengths) have been developed which are considered to be economically feasible, there has been no practical method of applying the coatings to the exterior of very large pipe sections.

The present invention relates to a method and means for applying this relatively new Nap-Gard plastic coating or other suitable plastic coatings to the exterior of very large pipe sections. For example, pipe sections having a diameter of approximately twenty inches, and larger, and lengths varying from approximately fifty-four feet to sixty-two feet, may be efficiently coated in a manner wherein the expense is reduced to a minimum, or at least maintained within a practical economic range. Each pipe section to be coated is initially engaged at the opposite ends, regardless of the length thereof, by a first carrier device which is mounted on a rail, track, or the like, for facilitating transporting of the pipe section through the first steps in the coating operation. The first carrier device moves the pipe section into the proximity of a heating apparatus. The pipe is elevated to a height of aproximately four feet, or higher, from the grade, and is rotated about the longitudinal axis thereof. Heat is applied to the pipe by any suitable means for a position substantially below the pipe section.

Heating of the pipe section must be carefully controlled to prevent the pipe temperature from exceeding 500° F. Above this temperature structural changes occur in the steel which significantly reduces its strength. Thus, if operated at the usual high pressure of a gas transmission pipe line it would substantially increase the dangers of accidental explosion, and the dangers resulting therefrom. On the other hand, small diameter pipes which are not used for high pressure gas lines do not have a restriction on temperature during processing. Small pipe processing such as shown in the Michael et al. Pat. No. 3,294,573, issued Dec. 27, 1966, and entitled "Method for Coating Pipe" clearly indicates no such temperature restriction.

The heated pipe is deposited on a suitable rack and is picked up therefrom by a second carrier device. The second carrier device moves the pipe section into the proximity of a first spraying apparatus. The spraying apparatus is movable along the length of the pipe section, and the pipe is continually rotated as the spraying apparatus moves therealong to provide a thorough coating of the exterior of the pipe with the first plastic material which may be either a liquid or powder. This unique method of applying the coating material results in the coating being applied in a uniform helical pattern around the pipe. Other methods in use today, such as shown in the M. R. Miller Pat. No. 2,781,279, issued Feb. 12, 1957, and entitled "Method and Apparatus for Spray Coating of Articles," and M. R. Miller Pat. No. 2,777,784, issued Jan. 15, 1957, and entitled "Method and Apparatus for Spray Coating of Articles," arrange fixed guns around fixed pipe to obtain a helical pattern. In the event one or more guns fail, this results in thin or bare areas of coating running longitudinally the whole length of the pipe. The present method precludes any possibility of a longitudinally extending thin section of coating and produces fully uniform coating by adjusting the speed of longitudinal travel of the coating apparatus and the rotational rate of speed of the pipe such that consecutive layers of coating deposited by each and every gun overlap many times, thus failure of one, or even more guns is unimportant.

Subsequent to the first or initial coating operation, the second carrier device moves the coated pipe to the proximity of a second spray apparatus which electrostatically sprays a dry powder onto the pipe. As the second spray apparatus transverses the length of the pipe, the second layer of the coating material is applied to the exterior of the pipe in a helical spray pattern as hereinbefore set forth and, of course, the pipe is rotated during the second spraying operation to assure an efficient and thorough covering of the exterior surface or outer periphery thereof. The pipe is then transported by the second carrier to a second heating station. The second carrier deposits the coated pipe section onto special saddles so arranged that no part of the saddle touches the coated exterior portions of the pipe. A third carrier device or car engages the pipe section, raises the pipe, and rotates the pipe above the second heating station to insure proper curing of the coating. The heating at the second station is again controlled to preclude pipe temperatures in excess of 500° F. The third carrier then unloads the pipe on a cooling or inspection station. Although cooling is not required in the process, it is sometimes desirable to cool the pipe to allow early handling of the coated pipe.

In some cases, it may be desirable to omit the second heating operation in which case the pipe is unloaded directly onto the inspection station.

It is an important object of this invention to provide a novel method and means for efficiently and economically coating the exterior of very large pipe sections.

Another object of this invention is to provide a novel method and means for coating the exterior of very large pipe sections wherein the pipe is moved through the coating operation by mechanical means for facilitating the handling of the pipe sections.

Still another object of this invention is to provide a novel method and means for coating the exterior of very large pipe sections wherein substantially any length of pipe section may be efficiently handled throughout the coating operation.

A further object of this invention is to provide a novel method and means for coating the exterior of very large pipe or cylindrical objects wherein the coating material may be applied evenly and in an uninterrupted path through the entire length of the pipe.

A still further object of this invention is to provide a novel method and means for coating the exterior of very large pipe sections wherein the coating is applied in multiple layers with a sufficient heating operation for curing of the layers of coating material.

It is still another object of this invention to provide a novel method and means for coating the exterior of very large pipe sections wherein the pipe is rotated during any heating operation for facilitating the curing of the coating material applied to the pipe.

A still further object of this invention is to provide a novel method and means for spraying very large pipe sections with multiple layers of coating material.

Another object of this invention is to provide a novel method and means for coating the exterior of very large pipe sections which is simple and efficient in operation and economical and durable in construction.

Other and further objects and advantageous features of the present invention will hereinafter more fully appear in connection with a detailed description of the drawings in which:

FIG. 1 is a side elevational view in schematic form depicting the overall method and means for coating the exterior of pipe according to the present invention.

FIG. 2 is a plan view in schematic form depicting the overall method and means for coating the exterior of pipe according to the present invention.

FIG. 8 is a view similar to FIG. 1 depicting a modified form of the invention.

FIG. 9 is a view similar to FIG. 2 depicting the modified form of the invention.

Figure 4:
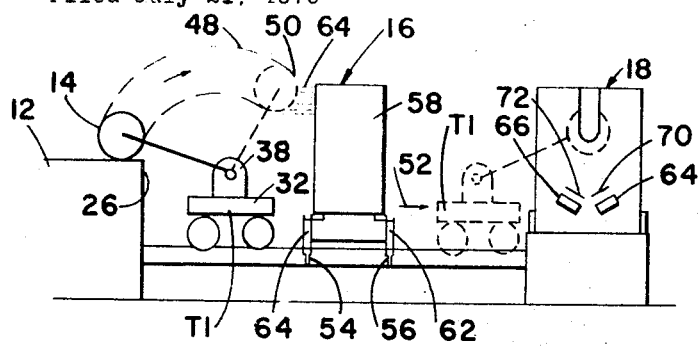
FIG. 4 is a view similar to FIG. 1 depicting the initial steps in the pipe coating method embodying the invention.
Figure 5:
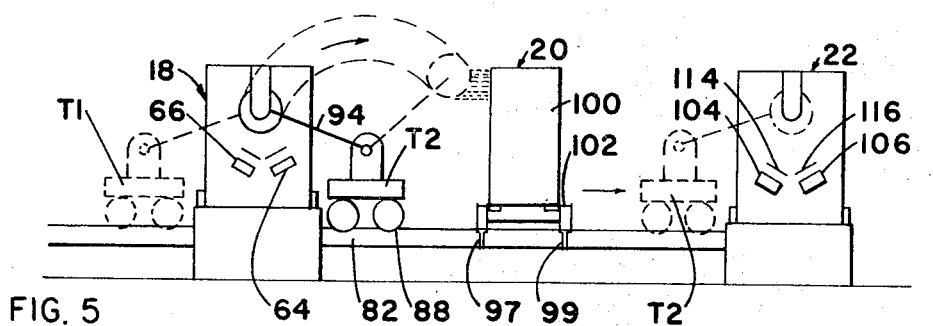
FIG. 5 is a view similar to FIG. 4 depicting the intermediate steps of the coating operation embodying the invention.
Figure 6:
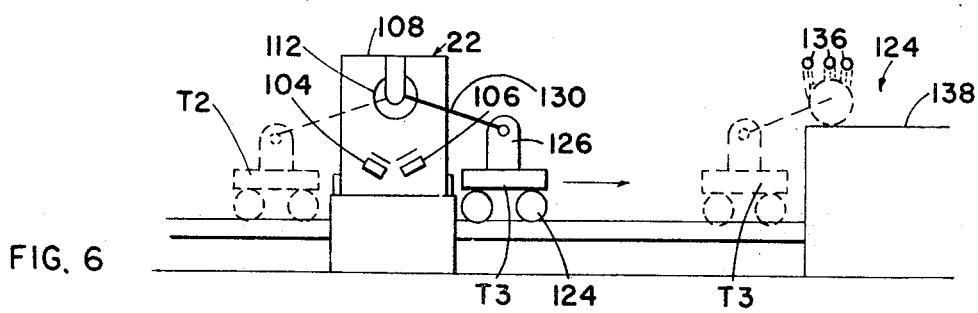
FIG. 6 is a view similar to FIG. 4 depicting the final stages of the coating method embodying the invention.

Referring to the drawings in detail and particularly FIGS. 1 through 7, reference character 10 generally indicates an apparatus for coating the exterior of the pipe sections and broadly comprises a first station 12 which may be in the form of a receiving platform, or the like, wherein a pipe section 14 to be treated or coated may be initially deposited. A second station 16 in the form of a spray coating apparatus is spaced from the first station 12, and a first carrier device $T_1$ is provided for carrying or transporting the pipe section from station 12 to station 16 in a manner as will be hereinafter set forth. The carrier $T_1$ supports the pipe section 14 in the area of station 16 during the initial coating operation, and subsequently carries the initially coated pipe to a third station 18, which is a heating area of any suitable type. The coated pipe is deposited in the heating area, as will be hereinafter set forth in detail, and released by the carrier $T_1$, whereupon the pipe section is supported at the heating station 18 during the heating of the pipe to effect a curing of the initial coating thereon. Care is taken at the heating area 18 to preclude heating of the pipe above 500° F. Subsequent to the heating of the pipe, the pipe 14 is picked up by a second carrier $T_2$ which is provided for carrying the initially coated and heated pipe 14 to a fourth station 20 which is in the form of an electro-spray coating apparatus. The carrier $T_2$ supports the pipe section 14 in the area of the station 20 during the application of a second layer of coating material to the exterior of the pipe section 14. The carrier $T_2$ then carries or transports the pipe section to a fifth station 22 which is a second heating area generally similar to the first heating area 18, and the pipe is deposited in the heating area 22 and disengaged from the carrier $T_2$. The pipe is then supported at the heating station 22 during a second heating operation for drying and/or curing of the second layer or both layers of coating on the pipe. The heated pipe 14 is then engaged by a third carrier $T_3$ and transported to a sixth station 24, which is a cooling area. The pipe section 14 is then deposited at the cooling area where the hot coated pipe is cooled for completing the coating operation. Of course, the coated pipe section may then be moved to storage or delivered to a consumer in any well known manner (not shown).

It is to be understood that in certain instances it may be possible to reverse the positions of stations 16 and 18 whereby the pipe will be heated prior to the application of the first layer of coating material. The second layer of coating material may then be applied followed by the second heating operation as shown in FIGS. 8 through 14 and as will be hereinafter more fully set forth. It may be found that application of the second layer at a relatively short time interval after the first coating operation, for example approximately fifteen seconds, will eliminate the need of a second heating operation.

Figure 3:
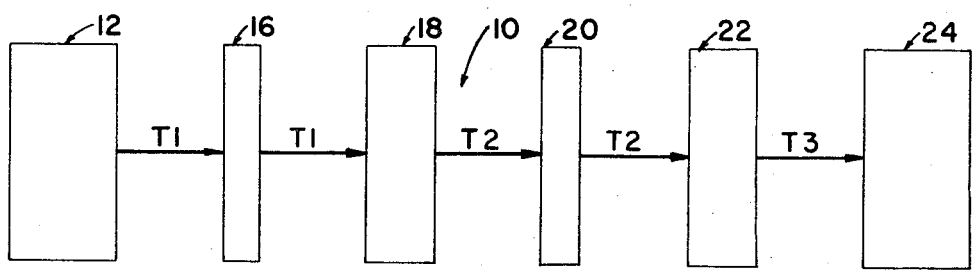
FIG. 3 is a block diagram of the steps involved in the novel coating method embodying the invention.
Figure 7:
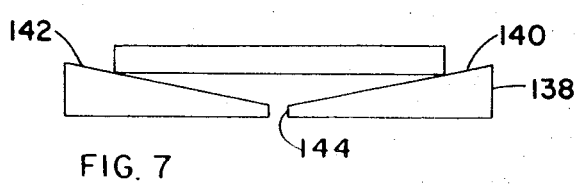
FIG. 7 is a sectional elevational view of a quenching station such as may be utilized with the invention.
Figure 11:
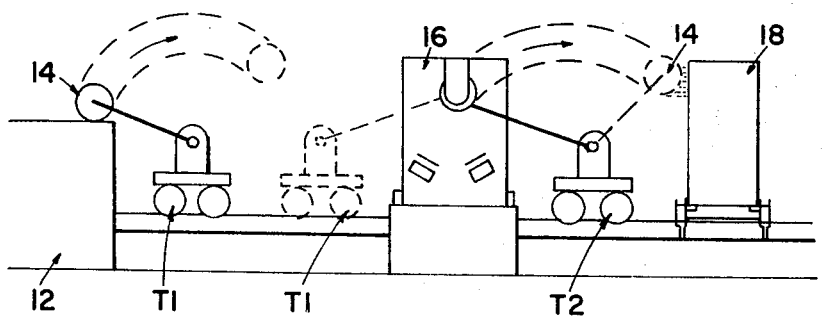
FIG. 11 is a view similar to FIG. 4 depicting the modified form of the invention.
Figure 12:
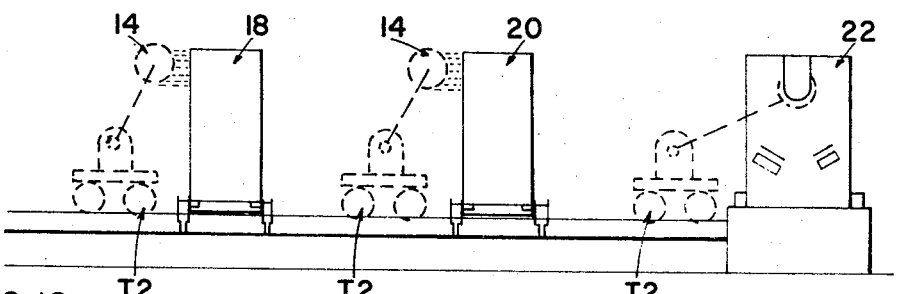
FIG. 12 is a view similar to FIG. 5 depicting the modified form of the invention.
Figure 13:
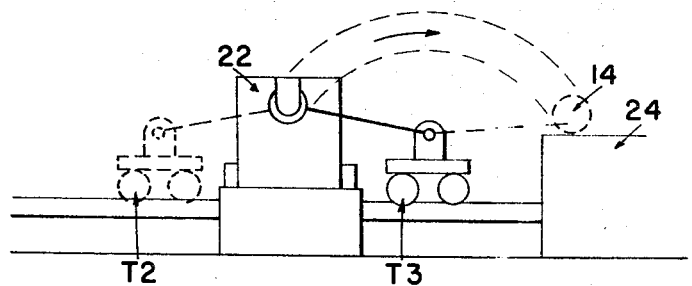
FIG. 13 is a view similar to FIG. 6 depicting the modified form of the invention.
Figure 10:
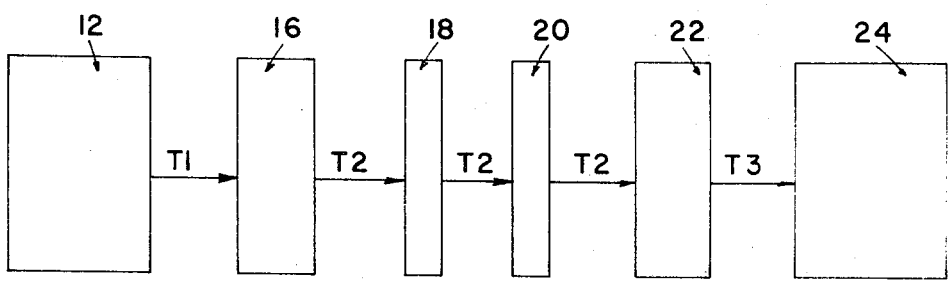
FIG. 10 is a view similar to FIG. 3 depicting the modified form of the invention.
Figure 14:
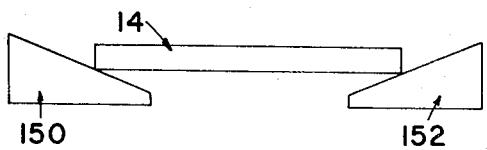
FIG. 14 is a side elevational view of a special saddle structure for handling of the pipe during the coating operation embodying the invention.

Station 12 is provided for initially receiving and supporting the uncoated pipe section 14, as particularly shown in FIGS. 2, 3 and 4, regardless of the diameter of length of the pipe section. Of course, the overall dimensions of the platform or station 12 are selected to accommodate the largest pipe section, and as a result will be adequate for supporting the smaller pipe sections. The pipe section 14 is disposed on the platform 12 in such a manner that the axis of the pipe and the edge 26 of the platform or station 12 are substantially parallel as shown in FIG. 2. A pair of spaced substantially parallel tracks or rails 28 and 30 extend at substantially right angles from the edge 24 in a direction toward stations 16 and 18 and may terminate in the proximity of station 18, if desired. Of course, it is preferable that the exterior surfaces of the pipe be thoroughly claned prior to the coating thereof. The cleaning may be done in any well known manner, such as use of an abrasive, or the like (not shown).

The carrier $T_1$ rides or moves along the rails 28 and 30 in directions away from and toward station 12 and comprises a longitudinally extending support member 32 which spans the distance between the rails 28 and 30. A pair of wheels 34 and 36 are suitably journalled in the proximity of each end of the support 32 (only one pair of which is shown in the drawings) for engaging the rails 28 and 30 whereby the support member 32 may be moved therealong in much the same manner as the well known overhead type crane. A pair of upstanding gear box structures 38 and 40 are mounted on the support member 32 in any suitable manner (not shown) whereby the distance between the gear boxes 38 and 40 may be varied in accordance with the length of the pipe section 14 to be processed or coated. The gear boxes 38 and 40 are provided with outwardly extending arm members 42 and 44, respectively, which are pivotally mounted on the gear box in any suitable manner (not shown) for a purpose as will be hereinafter set forth.

A substantially circular plug member 46 is rotatably secured to the outer end or outer extremity of each arm 42 and 44 in any suitable manner (not shown) and each plug 46 is adapted for insertion within the open ends of the pipe section 14 for connecting the arms 42 and 44 with the pipe.

The plug members 46 are constructed in such a manner that the outer diameter thereof may be readily adjusted to correspond to the inner diameter of the pipe section whereby the plugs may be utilized for engaging substantially any size pipe section to be treated or coated by the apparatus 10. It is to be understood that, whereas relatively small pipe sections may be processed by the apparatus 10, the device disclosed herein is particularly designed and constructed for the handling of relatively large size pipe sections, such as pipes having diameters of twenty inches, and greater, and of lengths from approximately fifty-four feet to sixty-two feet, and weighing up to approximately six tons. In addition, the plugs 46 may be provided with suitable rollers, or the like (not shown) for facilitating insertion of the plugs in the ends of the pipe section 14. Of course, the distance between the gear boxes 38 and 40 may be adjusted in any well known manner whereby the arms 42 and 44 will extend towards the ends of the pipe section in order to facilitate the insertion of the plugs in the open ends thereof. Of course, it is to be understood that alternatively, the gear boxes 38 and 40 may be mounted stationary on the support 32, and the arms 42 and 44 arranged for adjustment of the distance therebetween, if desired.

When both ends of the pipe section 14 have been securely engaged by the plug members 46, and the arms 42 and 44 are rotated by actuation of the gear boxes 38 and 40 for swinging or moving the pipe section through an overhead arc as indicated by the dotted lines 48 in FIG. 4, and to the position shown in dotted lines at 50. Of course, the carrier $T_1$ may also move in the direction indicated by the arrows 52, if desired, in order to position the elevated pipe section 14 in the proximity of the station 16. However, the spacing between the station 12 and station 16 may be so selected as to preclude the need for travel of the carrier $T_1$ and pipe subsequent to the swinging movement of the pipe.

The pipe 14 is maintained in the elevated position as shown at 50 during the application of the initial layer of coating of the plastic material on the outer periphery thereof. The first coating material may be in the form of a liquid, but is not in any manner limited thereto. As hereinbefore set forth, station 16 is a spraying station and comprises a pair of spaced tracks or rail members 54 and 56 which extend transversely between the tracks 42 and 44, and preferably extend therebeyond, as clearly shown in FIG. 2. A spraying apparatus 58 having suitable wheels 60 and 62 journalled thereon for riding or rolling along the tracks 54 and 56 is movably mounted on the tracks 54 and 56 and is provided with spray guns, spray nozzles, or the like (not shown) which direct jets 64 of the first coating material in a direction toward the suspended pipe 14.

The suspended pipe section 14 is rotated by the plugs 46 engaged in the ends thereof, and the spraying apparatus 58 is moved along the tracks 54 and 56 in any suitable manner (not shown) throughout a distance slightly greater than the overall length of the pipe section 14 being coated. Each spray nozzle is so arranged as to "see" the entire outer periphery of the pipe as the spraying apparatus 58 traverses the length of the rotating pipe 14 whereby the coating material is applied in a helical path by each nozzle. The nozzles will apply adjacent overlapping coatings thus assuring an efficient and thorough covering of the outer periphery thereof, and substantially eliminating any "holidays," thin areas, or the like in the coating. The spraying apparatus 58 begins spraying the first coating material onto the outer periphery of the pipe at one end of the pipe and continues to travel until the entire length of the pipe has been coated from end to end. When the spraying apparatus 58 reaches the second or opposite end of the pipe, the spray nozzles may be shut off to discontinue the spraying operation. However, the apparatus 58 continues to travel beyond the last end of the pipe section in order that the apparatus 58 will clear the tracks 28 and/or 30 in order to preclude impending of the movement of the carrier $T_1$ along the tracks 28 and 30. Of course, as a practical matter it is preferable to move the spraying apparatus 58 along the tracks 54 and 56 in one direction while spraying one pipe section, and return the spraying apparatus 58 along the tracks in a reverse direction while spraying the next succeeding pipe section, with the apparatus 58 being moved sufficiently beyond the end of the sprayed pipe in each instance for clearing the tracks 28 and 30.

Subsequent to the spraying of the suspended pipe 14 at the station 16, the carrier $T_1$ transports the initially coated pipe to station 18, and the arms 42 and 44 are rotated sufficiently for lowering the pipe 14 into the desired position at the heating station 18. The heating station 18 may be of any suitable type, and is preferably of a type wherein the heat is supplied from beneath the pipe. As particularly shown herein, the heating station comprises a plurality of longitudinally extending banks of heaters or burners 64 and 66 which extend through a distance at least as great as the overall length of the longest pipe section 14 to be coated. Of course, it is preferable to mount the burners on a suitable foundation or platform 68, and the burners are disposed at the optimum angle for directing the heat toward the outer periphery of the initially coated pipe 14, as particularly shown in FIG. 1. The coated pipe 14 is preferably initially deposited on a plurality of upwardly extending chock members (not shown) and the plugs 46 may be removed from the pipe ends, thus freeing the carrier $T_1$ to return to station 12 for picking up the next succeeding pipe section 14 to be processed in the apparatus 10. It is preferable to provide shutters 70 and 72, or the like, above the heaters or burners 64 and 66, respectively, during the time when the pipe section is resting on the chocks. This precludes any accidental overheating or scorching of the outer periphery of the pipe. Of course, the shutters 70 and 72 may be moved upwardly to the position shown in dotted lines in FIG. 1 during the actual heating operation.

A pair of frame supporting members 74 and 76 are provided for the heating station 18 and are preferably disposed in the proximity of the opposite ends of the pipe section 14. The supporting members 74 and 76 are mounted on wheels 78 in order that they may be rolled into a position adjacent the opposite ends of the pipe in order to engage the open ends thereof. Each frame 74 and 76 is provided with plug member 80 generally similar to the plugs 46, which are carried by the frames 74 and 76 in such a manner that the plugs 80 may be manipulated for engagement in the opposite ends of the pipe 14. When the pipe is engaged by the plugs 80, the chocks may be removed, and the plugs (which are rotatable, as are the plugs 46) rotate the pipe section during the heating operation.

When the initially coated pipe section 14 has been heated to the desired temperature, or through the desired time interval, as required for the curing or drying of the initial layer of coating material, the shutters 70 and 72 may be returned to the protective position between the pipe and the burners, and the chocks may be replaced under the pipe for support thereof. The plugs 80 may then be disengaged from the ends of the pipe whereby the pipe is ready for the next succeeding step in the coating process.

A pair of spaced substantially parallel rails 82 and 84 similar to the rails 28 and 30 extend from the station 18 in a direction toward the stations 20 and 22 and may terminate at station 22 if desired. The carrier $T_2$ is mounted on the rails and is substantially identical with the carrier $T_1$. Carrier $T_2$ comprises a support member 86 spanning the distance between the rails 82 and 84 having wheels 88 for rolling along the rails. Gear boxes 90 and 92 are mounted on the support member 86 in the same manner as the gear boxes 38 and 40, and are provided with outwardly extending arms 94 and 96, respectively, which are similar to the arms 42 and 44. A plug 98 is rotatably mounted at the outer extremity of each arm 94 and 96, and is similar to the plugs 46 and 80. The plugs 98 engage the open ends of the pipe section at the heating station 18, and swing the pipe upwardly in an overhead arc, as hereinbefore set forth, to suspend the pipe in the proximity of the spraying section 20.

The spraying section 20 is an electro-spray station and comprises a pair of substantially parallel rails or tracks 97 and 99 extending transversely between the rails 82 and 84. An electro-spraying apparatus 100 having wheels 102 is disposed on the rails 82 and 84 for rolling therealong, as hereinbefore set forth. The spray apparatus 100 is provided with nozzles or diffusers generally similar to that of the apparatus 58 and the pipe 14 is rotated by the plugs 98 as the apparatus 100 moves along the length thereof. The second coating material may be in the form of a dry powder and is electrostatically sprayed in a helical spray pattern on the pipe. Of course, there is no intention of limiting the second coating material to a powder since it may be in the form of a liquid, or the like. The apparatus 100 continues along the tracks 97 and 99 until the entire length of the pipe 14 is coated with the second layer of coating material, and continues to move therealong until the apparatus has cleared the tracks 82 and 84, as hereinbefore set forth.

Subsequent to the application of the second layer of coating material, the carrier $T_2$ moves along the tracks 82 and 84 for carrying the pipe 14 to the station 22. The arms 94 and 96 are rotated sufficiently for depositing the pipe in the heating station 22 in the same manner as in the heating station 18. The station 22 is substantially identical with the station 18 and comprises a plurality of heaters or burner banks 104 and 106 which extend throughout the length of the longest pipe to be processed in the apparatus 10. The station 22 is also provided with a pair of frame support members 108 and 110 similar to the support structures 74 and 76. Each support 108 and 110 is provided with a plug member 112 for engaging the open ends of the pipe 14 in the same manner as the plugs 80. Of course, the pipe is initially deposited on suitable chocks, of the like (not shown) in the heating station 22, as hereinbefore set forth, and the frame members 108 and 110 are moved into a position in the proximity of the ends of the pipe 14 whereby the plugs 112 may be inserted therein.

Shutter members 114 and 116 are interposed between the burners 104 and 106, respectively, as hereinbefore set forth, to preclude burning of the pipe resting on the chocks. When the pipe is engaged by the plugs 112, the chocks may be removed and the shutters moved to an out-of-the-way position whereby the heat from the burners 104 and 106 will radiate or be directed toward the pipe 14. The pipe is rotated by the plugs 112 during the heating operation, and when the pipe has been sufficiently heated for curing or drying of the second layer of coating material, the shutters 114 and 116 may be returned to the protective position between the pipe and burners, and the chocks may be inserted for supporting the pipe. The plugs 112 may then be disengaged from the pipe ends for freeing the pipe for the next step in the process.

A pair of spaced substantially parallel rails 118 and 120, similar to the rails 28 and 30, extend from the station 22 in a direction toward the station 24. Carrier $T_3$ is substantially identical with carriers $T_1$ and $T_2$ and functions for moving the coaed pipe from station 22 to station 24. The carrier $T_3$ comprises a support member 122 extending between the rails 118 and 120 and having wheels 124 for rolling therealong in order that the carrier $T_3$ may move between the stations 22 and 24. Gear boxes 126 and 128 similar to the gear boxes 38 and 40 are provided on the support 122 and are provided with rotatable arms 130 and 132, respectively. The arms 130 and 132 are similar to the arms 42 and 44 and a rotatable plug 134 is provided at the outer extremity of each arm 130 and 132. The plugs 134 are inserted in the end of the pipe in an overhead arc, as hereinbefore set forth, for placing the pipe at the station 24.

Of course, the carrier $T_3$ moves along the rails 118 and 120 through a sufficient distance for nearing the station 24, or alternatively, the station 24 may be spaced from the station 22 only that distance which may be reached by the arms 130 and 132, as desired. In any event, the pipe 14 is deposited at station 24 from carrier $T_3$ in order that the pipe may be cooled sufficiently for completing the coating operation.

The cooling station 24 may be of any suitable type, and as a practical matter it may even be desirable to merely deposit the hot pipe at the station 24 for gradual cooling under normal atmospheric conditions. As another example of a cooling method, it may be desirable to provide a plurality of overhead spray pipes 136 for sprinkling or spraying a coolant, such as water, over the pipe. In addition, a support or foundation 138 provided at the station 24 may comprise a pair of inwardly tapering surfaces 140 and 142 (FIG. 7) for receiving the opposite ends of the pipe thereon. Thus, any length of pipe will tend to center itself on the foundation 138, and the inner or central portions of the pipe 14 will be elevated with respect to the surfaces 140 and 142 for facilitating the flow or air and liquid thereunder. It is also preferable to provide a gap or opening 144 at the center of the foundation 138 whereby the water, or other liquid, may be accumulated for draining from the foundation into a sump, or the like (not shown). Of course, the drained cooling water or other liquid may be recirculated, if desired, for spraying through the pipes 136 in a continuous cooling operation.

It is to be understood that any suitable type cooling operation may be provided for the pipe in order to complete the coating process, and that depicted herein is merely illustrative of one such type. It may be found that the pipe may cool sufficiently during the final transporting operation whereby the coated pipe section 14 may be deposited directly in any well known manner (not shown) at a storage area (not shown) or to a delivery dock (not shown).

It will be apparent that a second or succeeding pipe section may be engaged by the carrier $T_1$ as soon as the carrier has returned to station 12 subsequent to release of a pipe section at station 18. Thus, a plurality of pipe section may be processed at the same time, with each succeeding pipe section being handled in a station following that wherein the preceding pipe section is being processed. Thus, the pipe sections may be exteriorly coated relatively rapidly, which greatly reduces the overall cost of operation of the apparatus 10.

Referring now to FIGS. 8 through 14, a modified form of the invention is depicted at 10' generally similar to the embodiment depicted in FIGS. 1 through 7, but wherein the pipe section 14 is heated prior to the application of the first layer of coating material. The modified form of the invention broadly comprises a first station 12' which is a receiving station similar to the station 12 wherein the pipe section 14 to be coated is initially deposited. A second station 16' in the form of a heating station or heating area is spaced from the first station 12' and a first carrier device $T_1'$ is provided for carrying or transporting the pipe section 14 from the station 12' to the station 16'. The heating area 16' is generally similar to the heating area 18 in the preferred embodiment, and the carrier $T_1'$ is generally similar to the carrier $T_1$, and functions in substantially an identical manner for releasing the pipe and depositing the pipe section 14 at the heating station 16'.

Subsequent to the heating of the pipe 14 at the station 16', a second carrier $T_2'$, generally similar to the carrier $T_2$, picks up the heated pipe and transports the pipe to a first spraying station 18' in the manner as hereinbefore set forth. The spraying station 18' is generally similar to the station 16, and the pipe 14 is supported at the station 18' in the manner as hereinbefore set forth in connection with the station 16. The first layer of coating material is applied to the exterior of the pipe and in an overlapping helical pattern as hereinbefore set forth. Subsequent to the application of the first layer of coating material at the station 18', the carrier $T_2'$ transports the initially coated pipe 14 to a second spray coating station 20' which is generally similar to the station 20. The pipe 14 is supported at the coating station 20' in the manner as set forth in connection with the station 20, and the second layer of coating is applied thereto in a helical spray pattern as hereinbefore set forth in detail.

Subsequent to the application of the second layer of coating material to the exterior of the pipe 14, the carrier $T_2'$ transports the pipe to a second heating station or heating area 22' which is similar to the station 22. The pipe is released by the carrier $T_2'$ and deposited at the heating station 22' in the same manner as set forth in connection with the heating station 22. Subsequent to the second heating operation, a third carrier $T_3'$ picks up the hot pipe and transfers the pipe to an inspection area 24' similar to the station or area 24. As hereinbefore set forth; the carrier $T_3'$ need not travel but merely transfers the pipe from the heating station 22' to the inspection station 24'. Of course, if the distance between the two stations is too great, it may be necessary for the carrier $T_3'$ to travel in the manner as the carriers $T_1'$ and $T_2'$.

Although cooling is not required in the coating process, as a practical matter it is usually preferable to cool the coated pipe for facilitating an early handling thereof. Furthermore, in some instances it is desirable to omit the second heating operation. For example, the second layer may be applied at a relatively short time interval after the first coating operation such as approximately fifteen seconds, thus eliminating the need of a second heating operation. In this event, the coated pipe 14 is released by the second carrier $T_2'$ directly onto the inspection station 24'.

It is important that the coated portions of the pipe 14 not be engaged until the coating has had sufficient time to completely cure or set in order to preclude damage to the coating material. Consequently, the receiving station may be of a special saddle construction provided with a plurality of spaced oppositely disposed tapered rollers 150 and 152 adapted to engage the opposite ends of the pipe at the beveled end portions thereof only. This type device facilitates the handling of the coated pipe for moving the pipe along the inspection area in a manner precluding accidental engagement of the coated portion thereof.

From the foregoing it will be apparent that the present invention provides a novel method and means for coating the exterior of relatively large pipe sections. The coating is applied in two layers in one embodiment of the invention with a heating operation preceding or prior to the first coating operation and a heating operation subsequent to the second coating operation. In another embodiment of the invention, a heating operation may be provided succeeding each coating operation, or in some instances the second heating operation may be eliminated. The pipe section is moved progressively through the apparatus and is provided with a thorough coating in multiple layers of an overlapping helical spray pattern whereby holidays, thin and bare sections, and the like, are substantially eliminated. The first coating material may be a liquid, but is not limited thereto; and the second coating material may be a dry powder, but not limited thereto. The dry powder is electrostatically sprayed onto the initially coated pipe and results in a superior coating of the pipe. The novel method and means is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A method of coating the exterior of a tubular object having a diameter in excess of twenty inches with heat responsive coating material which comprises intially supporting the object with supporting means which securely engage the object at the interior of the opposite ends only thereof, moving the so-supported and so-engaged object to an elevated position, rotating the so-elevated object during a first coating operation by rotating said supporting means, moving the initially coated object to a second elevated position, rotating the object at the second elevated position during a second coating operation by rotating the supporting means, and heating the object independently of the coating operations at least once during said coating operations.

2. A method of coating the exterior of a tubular object as set forth in claim 1 wherein the second coating operation includes electro-spraying of the second coating material onto the object in a longitudinally moving path simultaneously with the rotation of the object to provide an overlapping helical spray pattern.

3. A method of coating the exterior of a tubular object as set forth in claim 1 wherein the engaged object is rotated about the longitudinal axis thereof during the heating operation, and including controlling of the heating operation so that heating is accomplished substantially from beneath the engaged object to preclude heating of the object to a temperature exceeding 500° F.

4. A method of coating the exterior of a tubular object as set forth in claim 1 including controlling of the heating to preclude heating of the object to a temperature exceeding 500° F.

5. A method of coating the exterior of a tubular object as set forth in claim 1 wherein the second coating operation includes electro-spraying of the second coating material onto the object in an over-lapping helical spray pattern.

6. A method of coating the exterior of a tubular object having a diameter in excess of twenty inches with heat responsive coating material which comprises initially supporting the object with a first supporting means which securely engages the object at the interior of the opposite ends only thereof at a first station, moving the so-supported and so-engaged object to an elevated position at a second station, heating the so-elevated object at the second station while simultaneously rotating said object by rotating said first supporting means, releasing the engagement of the heated object for disposition from the second station, re-engaging and resupporting the heated object by means of a second supporting means which securely engages the object at the interior of the opposite ends only thereof, elevating the so-supported and so-engaged heated object and moving the same to a third station, rotating said object while simultaneously applying a first layer of coating material to the exterior of the engaged object at the third station, said rotation being applied to said object by rotating said second supporting means, moving the initially coated object to an elevated fourth station, applying a second layer of coating material to the exterior of the engaged object at said fourth station while simultaneously rotating said object by rotating said second supporting means, moving the engaged object to a fifth station, releasing the engagement of the object for disposition at the fifth station, re-engaging the object at the fifth station by means of a third supporting means which engages the object securely at the interior of the opposite ends only thereof, elevating and heating the engaged object at the fifth station, and moving the so-coated object to a sixth station for subsequent disposition thereof.

7. A method of coating the exterior of a tubular object as set forth in claim 6 wherein the initial engaging of the object and handling thereof from the first station to disposition thereof at the second station is through use of a first carrier, handling of the object from the second station to disposition thereof at the fifth station is through a second carrier, and handling of the object from the fifth station to the sixth station is through a third carrier.

References Cited
UNITED STATES PATENTS

| | | | |
|---|---|---|---|
| 2,291,823 | 8/1942 | Mickelson et al. | 214—1 X |
| 2,428,991 | 10/1947 | Ransburg | 117—93.4 X |
| 2,724,661 | 11/1955 | Juvinall | 117—94 X |
| 2,833,241 | 5/1958 | Crowley et al. | 118—62 |
| 2,842,272 | 7/1958 | Folks | 214—1 |
| 2,907,299 | 10/1959 | Weiner | 118—309 |
| 3,016,875 | 1/1962 | Ballentine et al. | 117—94 X |
| 3,208,868 | 9/1965 | Strobel et al. | 117—94 X |
| 3,248,253 | 4/1966 | Barford et al. | 117—17 |
| 3,242,131 | 3/1966 | Peerman | 117—21 X |
| 3,294,573 | 12/1966 | Michael et al. | 117—94 X |
| 3,323,934 | 6/1967 | Point | 117—93.4 X |
| 3,490,934 | 1/1970 | Oakley et al. | 117—17 X |
| 3,513,012 | 5/1970 | Point | 117—21 X |
| 3,581,922 | 6/1971 | Versoy et al. | 118—320 |

OTHER REFERENCES

Rothschild, Malcom V.: "Production Setups for Fluidized-bed Coatings," Modern Plastics, January 1962.

WILLIAM D. MARTIN, Primary Examiner

M. SOFOCLEOUS, Assistant Examiner

U.S. Cl. X.R.

117—16, 18, 20, 21, 93.4 R, 93.43, 94, 105.4; 118—621, 630, 641, 308, 320, DIG 11